United States Patent
Richter et al.

(10) Patent No.: US 8,550,127 B2
(45) Date of Patent: Oct. 8, 2013

(54) CATALYST LOADING SYSTEM

(75) Inventors: Peter Richter, Schwarzbach (DE); Peter Markowski, Merseburg (DE); Petras Kruopys, Schwarzbach (DE)

(73) Assignee: Unidense Technology GmbH, Schwarzheide (DE)

( * ) Notice: Subject to any disclaimer, the term of this patent is extended or adjusted under 35 U.S.C. 154(b) by 879 days.

(21) Appl. No.: 12/617,461

(22) Filed: Nov. 12, 2009

(65) Prior Publication Data

US 2010/0175775 A1 Jul. 15, 2010

Related U.S. Application Data

(63) Continuation-in-part of application No. 12/599,777, filed as application No. PCT/EP2008/006646 on Aug. 13, 2008, now Pat. No. 8,011,393.

(60) Provisional application No. 61/116,140, filed on Nov. 19, 2008.

(51) Int. Cl.
*B65B 1/20* (2006.01)

(52) U.S. Cl.
USPC ............... 141/73; 141/65; 141/365; 414/287; 193/32

(58) Field of Classification Search
USPC .................. 141/65, 311 R, 364, 73, 286, 365; 414/287; 193/32; 239/379
See application file for complete search history.

(56) References Cited

U.S. PATENT DOCUMENTS

| 3,608,751 A | 9/1971 | Hundtofte |
| 4,461,327 A | 7/1984 | Magin |
| 6,981,422 B1 | 1/2006 | Comardo |
| 7,597,529 B2 * | 10/2009 | Diehl et al. ................ 414/804 |
| 8,025,472 B2 * | 9/2011 | Fry ............................ 414/160 |
| 2002/0129642 A1 | 9/2002 | Johns |
| 2003/0217783 A1 * | 11/2003 | Harris ......................... 141/67 |

FOREIGN PATENT DOCUMENTS

| EP | 1374985 A1 | 1/2004 |
| EP | 1749568 A1 | 2/2007 |
| WO | PCT/US04/12390 A1 | 11/2004 |
| WO | PCT/EP04/09226 A1 | 3/2005 |

* cited by examiner

*Primary Examiner* — Jason K Niesz
(74) *Attorney, Agent, or Firm* — Leydig, Voit & Mayer, Ltd.

(57) ABSTRACT

A reformer tube processing and filling system is provided for ensuring uniformity of reformer tube flow rates and reactivity. The disclosed invention provides a system for detecting and removing tube obstructions, as well as an automated process for verifying the flow rate for each tube and identifying tubes with abnormal flow rates to remove a source of human error and conserve labor costs. An automated tube filling system provides a calibrated fill mechanism coordinated with a calibrated loading rope withdrawal mechanism to ensure loading consistency. A lack of vibrating parts ensures a low dust count, and what little dust is present is removed via a built-in vacuum outlet in the loader.

8 Claims, 9 Drawing Sheets

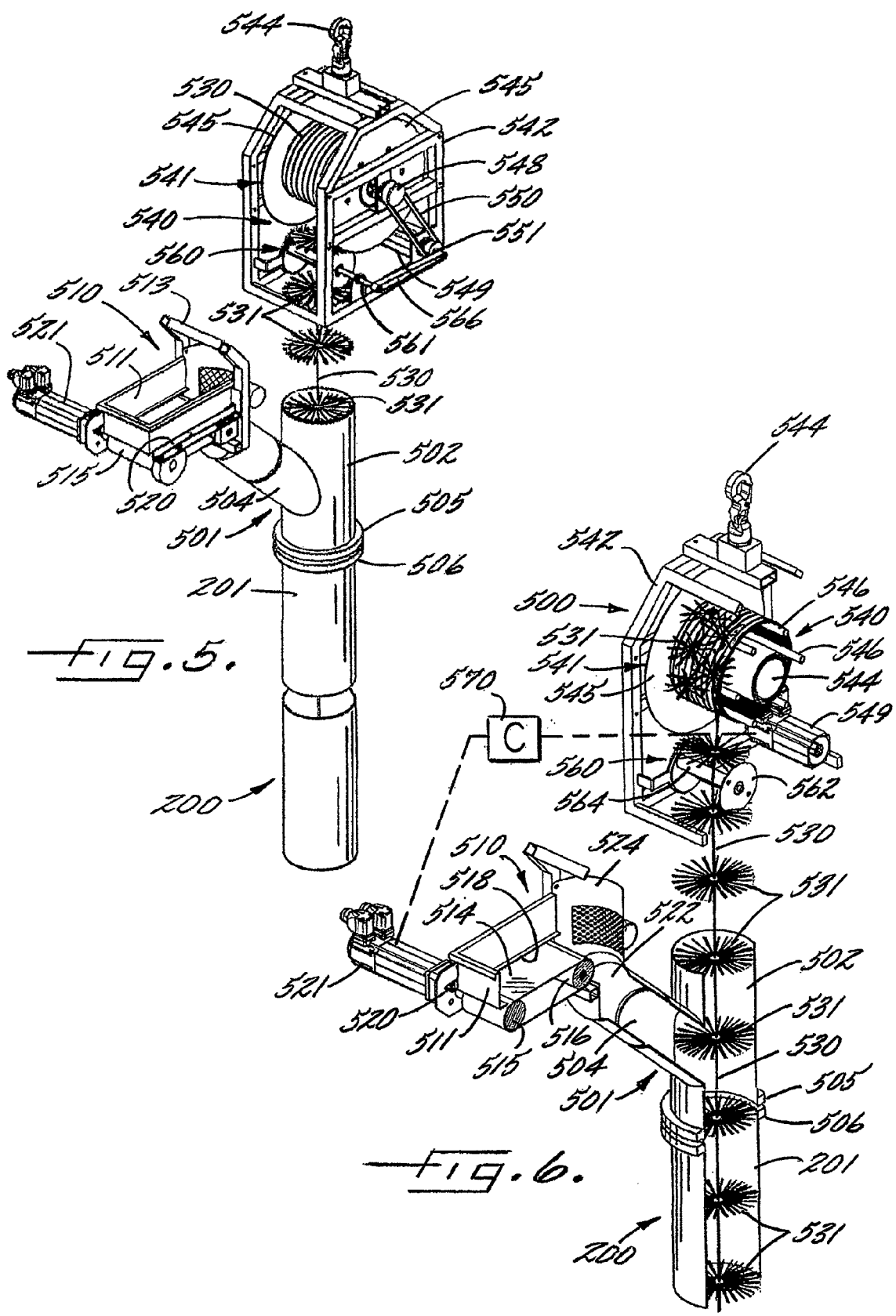

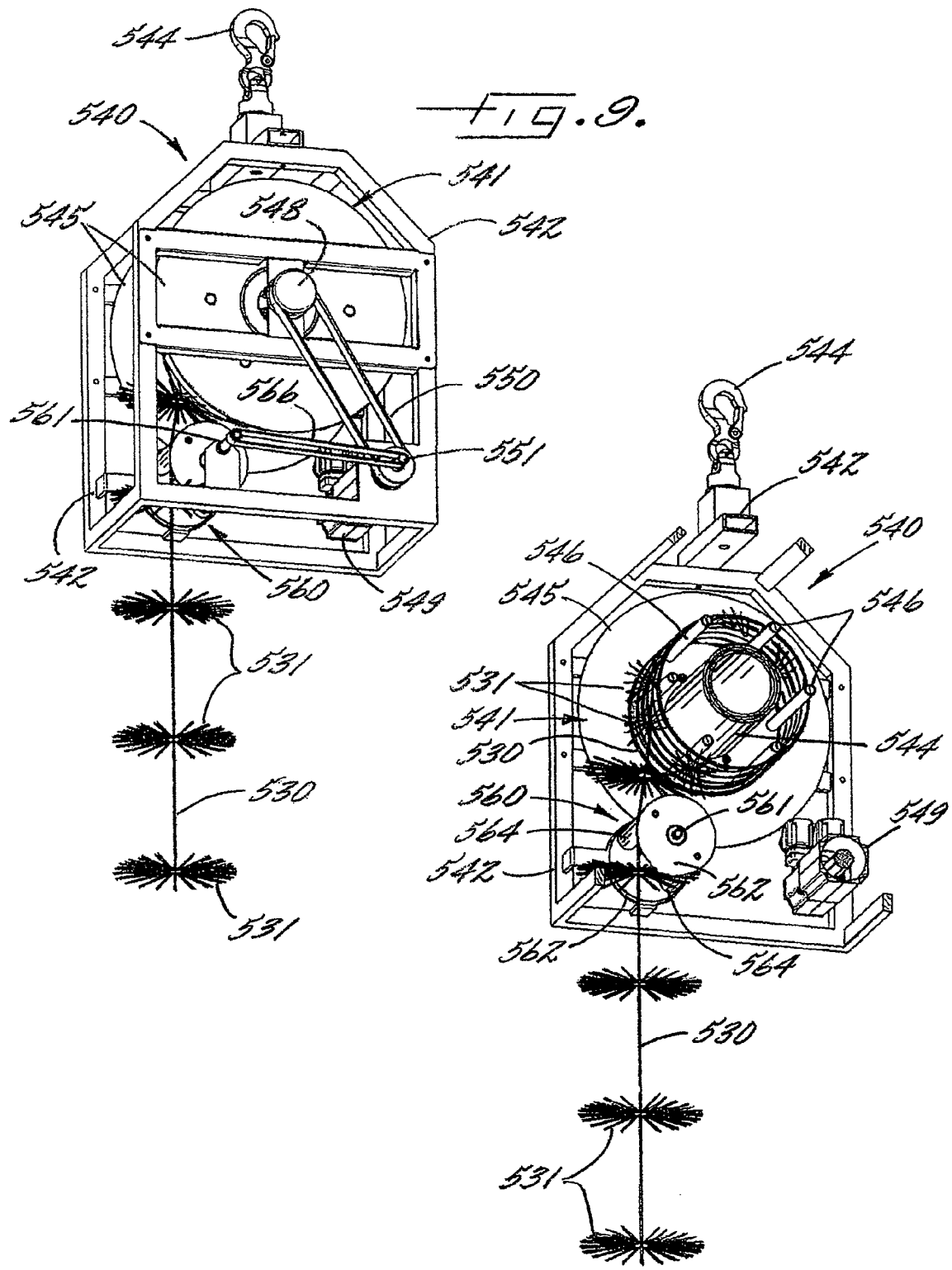

CATALYST LOADING SYSTEM

CROSS-REFERENCE TO RELATED APPLICATIONS

This patent application claims the benefit of U.S. Provisional Patent Application No. 61/116,140, filed Nov. 19, 2008, which is incorporated by reference in its entirety. This patent application also is a continuation-in-part of co-pending U.S. application Ser. No. 12/599,777, filed Nov. 11, 2009, also incorporated herein by reference in its entirety, which is the national phase of and claims priority on PCT/EP2008/006646, filed Aug. 13, 2008, which in turn claims priority on Netherlands Patent 1034249, filed Aug. 13, 2007.

FIELD OF THE INVENTION

The present invention relates generally to a method and apparatus for filling particulate material into tubes, and more particularly, to catalyst processing and the loading of particulate catalyst material into reformer tubes with a uniform density.

BACKGROUND OF THE INVENTION

Catalytic processing is required to execute certain material processing tasks such as chemical refinement of fluid and gaseous materials. For example, in the process of catalytic cracking for petroleum refinement, it is common to use a catalytic material to facilitate the desired cracking or other transformation. Typically, the material to be refined is directed through an appropriate catalytic material until a certain level of transformation has occurred. Because the catalytic efficiency of the system is strongly related to the frequency with which molecules or particles of the starting substance interact with the catalyst, the industry has adopted a practice of performing such catalytic processes in long tubes. In particular, the starting material is forced through a set of parallel tubes, each containing the catalyst material at a predetermined desired density, e.g., particles per unit volume or weight per unit volume.

The flow rate of the material through the system is equal to the sum of the flow rates through the multiple tubes, however, it is possible for one or more tubes to exhibit lower flow rates than other tubes. Lower flow rates generally are due to clogging or overfilling of the tubes, which can have the deleterious effect of prematurely exhausting or damaging the tubes with higher flow rates. Because catalytic refineries typically are run nonstop, it is expensive to shut the process down prematurely to service the catalyst tubes; maintenance on the tubes is ideally only performed once in the course of several years. Thus, the loading of the catalyst tubes is a critical step, and the failure to properly execute this step can cause the process operator to incur financial losses due to lost production during repair as well as increased labor costs to execute the repairs.

A properly prepared set of catalyst tubes will have relatively uniform resistance to flow from tube to tube, thus ensuring uniform flow rates, and will also have a relatively uniform density of catalyst from tube to tube, thus ensuring the same degree of product transformation for each tube. Thus, the tubes must be properly checked, cleaned, and filled with catalyst. Existing cleaning and filling protocols are subject to high cost and frequent human error due to their use of numerous personnel in time-consuming tasks. Although attempts have been made to solve the foregoing problems, a solution has not yet been devised that fully addresses the concerns without introducing further significant problems or costs.

OBJECTS AND SUMMARY OF THE INVENTION

It is an object of the present invention to provide a system for ensuring tubes are in optimal condition for automated uniform filling of particulate material, and particularly particulate catalyst material.

Another object is to provide an automated loading system for more quickly and uniformly directing the particulate material into reformer tubes.

In carrying out the invention, a reformer tube processing and filling system is provided for ensuring uniformity of reformer tube flow rates and reactivity. With respect to ensuring uniform flow rates, the subject invention provides a system for detecting and removing tube obstructions, as well as for verifying the flow rate for each tube and identifying tubes with abnormal flow rates. The verification process may be automated, thus removing a source of human error, and conserving labor costs.

With respect to ensuring uniform reactivity, an automated tube filling system is provided. The automated tube filling system provides a calibrated fill mechanism coordinated with a calibrated loading rope withdrawal mechanism to ensure loading consistency. A lack of vibrating parts ensures a low dust count, and what little dust is present may be removed via a built-in vacuum outlet in the loader.

Other objects and advantages of the invention will become apparent upon reading the following detailed description and upon reference to the drawings, in which:

BRIEF DESCRIPTION OF THE DRAWINGS

FIG. 5 is a perspective of an illustrated catalyst tube loading system in accordance with the invention;

FIG. 6 is a perspective of the illustrated catalyst loading system with portions broken away;

FIG. 9 is an enlarged perspective of the loading rope lifting device of the illustrated dispensing system;

FIG. 10 is a perspective of the lifting device shown in FIG. 9 with portions broken away;

Figure 1:
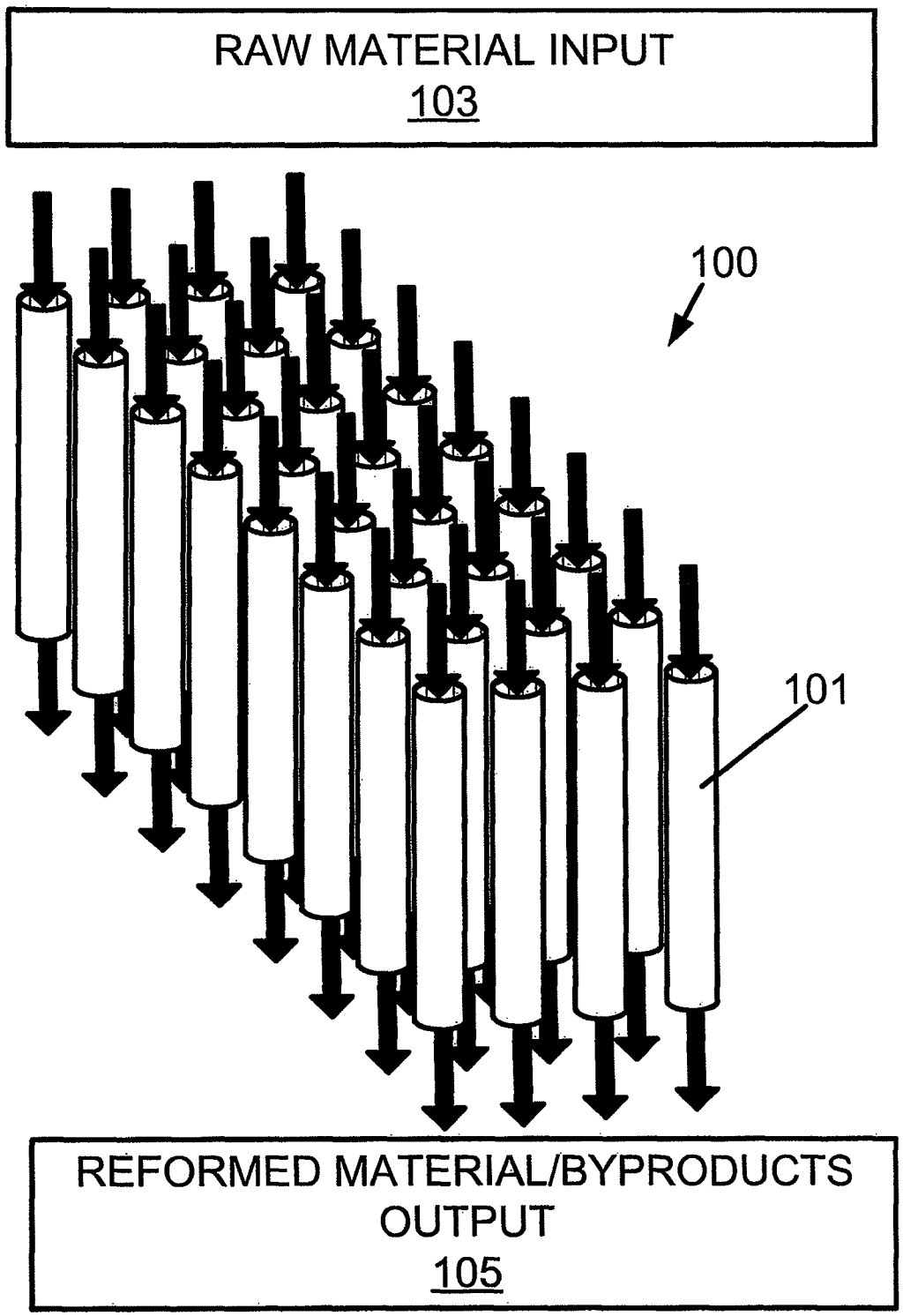
FIG. 1 is a simplified schematic view of a set of reformer tubes with respect to which the invention may be used.

While the invention is susceptible of various modifications and alternative constructions, certain illustrative embodiments thereof have been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring now more particularly to FIG. 1, there is schematically shown, a portion of an exemplary reformer tube set 100 within which the present invention may be implemented to provide a uniform flow rate and processing efficiency. The exemplary tube set 100 includes numerous individual tubes 101, each being filled with a catalyst material to receive an incoming flux 103 of raw material and to provide an outgoing flux 105 of processed material. It will be appreciated that the processed material may include a desired material as well as byproducts of the reformation process. Moreover, it will be appreciated that the illustrated tube set 100 is shown in simplified form for the purpose of clarification, and that an actual reformer tube set may include a greater or lesser number of tubes, e.g., from 1 to 1000 tubes, and each tube will typically be of a much greater length relative to its width than is illustrated. For example, typical reformer tubes are between 10 and 16 meters in length.

To minimize maintenance and idle costs associated with the operation of the tube set 100, it is desirable to ensure that each tube 101 is loaded with catalyst (not shown in FIG. 1) to a uniform density and that each tube 101 is of similar flow resistance. This will ensure that the incoming flux 103 of raw material is divided equally among the tubes for processing. In particular, the proportion of the incoming flux 103 of raw material that is allocated to each tube 101 will depend, according to the laws of parallel resistance, upon the relative differences in resistance to flow between the tubes 101. If there are no substantial differences in flow resistance across the tube set 100 from tube to tube, then the incoming flux 103 of raw material will be divided equally among the tubes 101 of the set 100.

As noted above, the parameters that affect flow rate and processing efficiency for each tube are flow resistance, tube volume, and catalyst density. Although these parameters are not entirely dependent, each will be addressed separately herein for the sake of clarity. Those of ordinary skill in the art will appreciate the degree to which and manner in which each of these parameters may affect the others.

Pursuant to one aspect of the invention, in order to ensure uniform flow resistance across the tubes 101 of the tube set 100, each tube 101 is checked for contaminating deposits and is cleaned if necessary. In an embodiment of the invention, empty tubes are first inspected for contamination. In an particular embodiment of the invention, the inspection mechanism is a video camera mounted on an extended flexible member such as a rod, for lowering into the tube of interest. In an alternative embodiment of the invention, the inspection mechanism comprises a laser sensor to measure the total amount of foreign matter in the tube.

Figure 2:
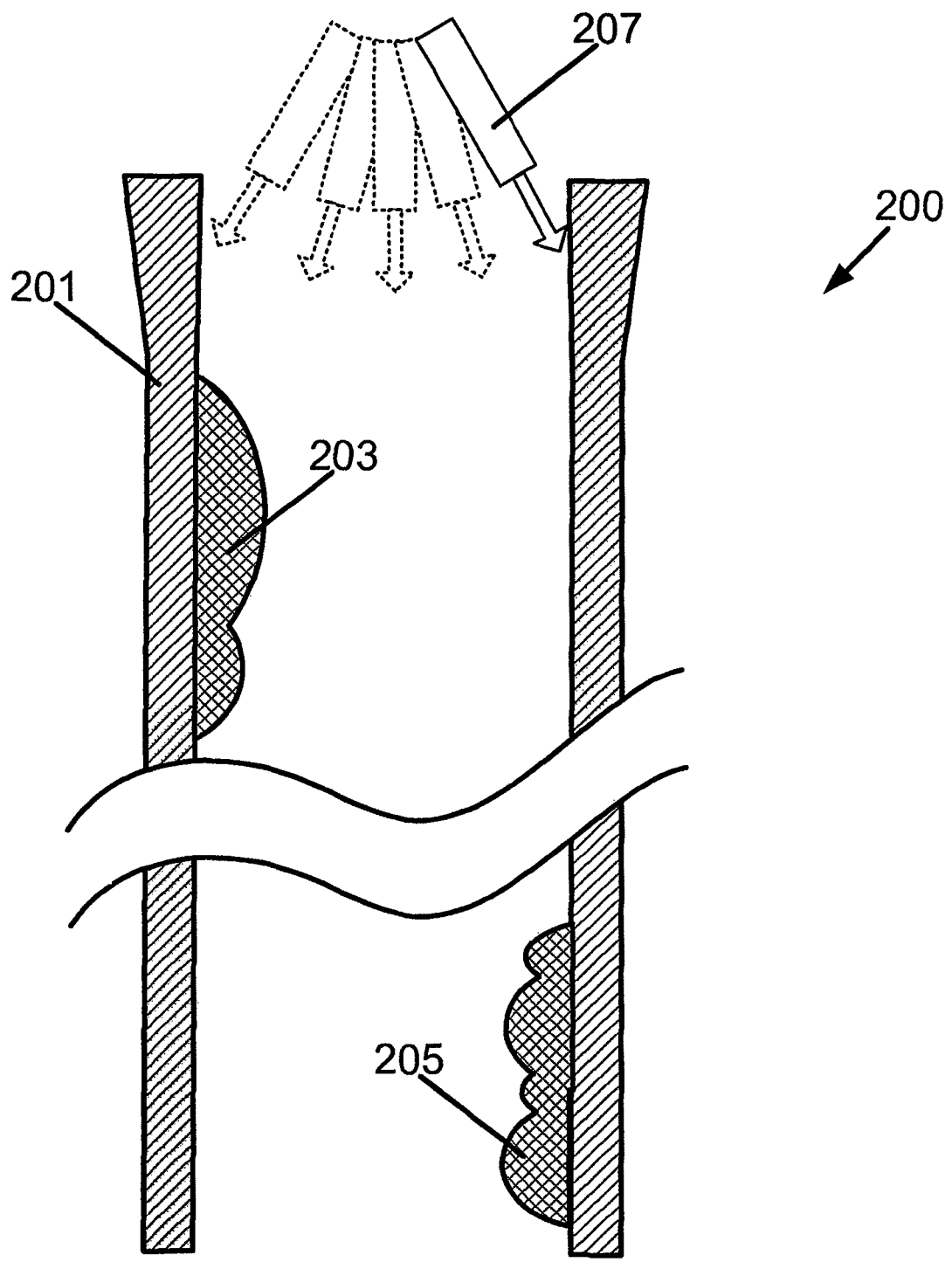
FIG. 2 is cross-sectional side view of a contaminated reformer tube undergoing laser analysis for volume determination according to an embodiment of the invention.

Referring now more particularly to FIG. 2, a cross-sectional side view of a contaminated tube 200 is shown. In the illustrated example, the tube wall 201 is contaminated by multiple deposits 203, 205 of byproduct materials. In the case of petroleum refinement, the deposits 203, 205 may be tar-like deposits, sulfur or other mineral deposits, or other byproduct or contaminant substances.

In the illustrated embodiment of the invention, a laser sensor system 207 is used to analyze the content of the tube. The laser system 207 may be a scanning or sweeping laser system, or other system configured to analyze substantially all of the interior of the tube 200. The laser sensor system 207 in an embodiment of the invention determines the volume of the tube 200 that is displaced by the deposits 203, 205. Although very small deposits need not be removed, it is desirable to clean the tube 200 if the amount of contaminant displacement exceeds a certain threshold, e.g., 5% of the nominal volume of the tube 200. Those of skill in the art will be aware of the means available to remove contaminant deposits such as those illustrated in FIG. 2, and these means need not be further discussed herein.

Figure 3:
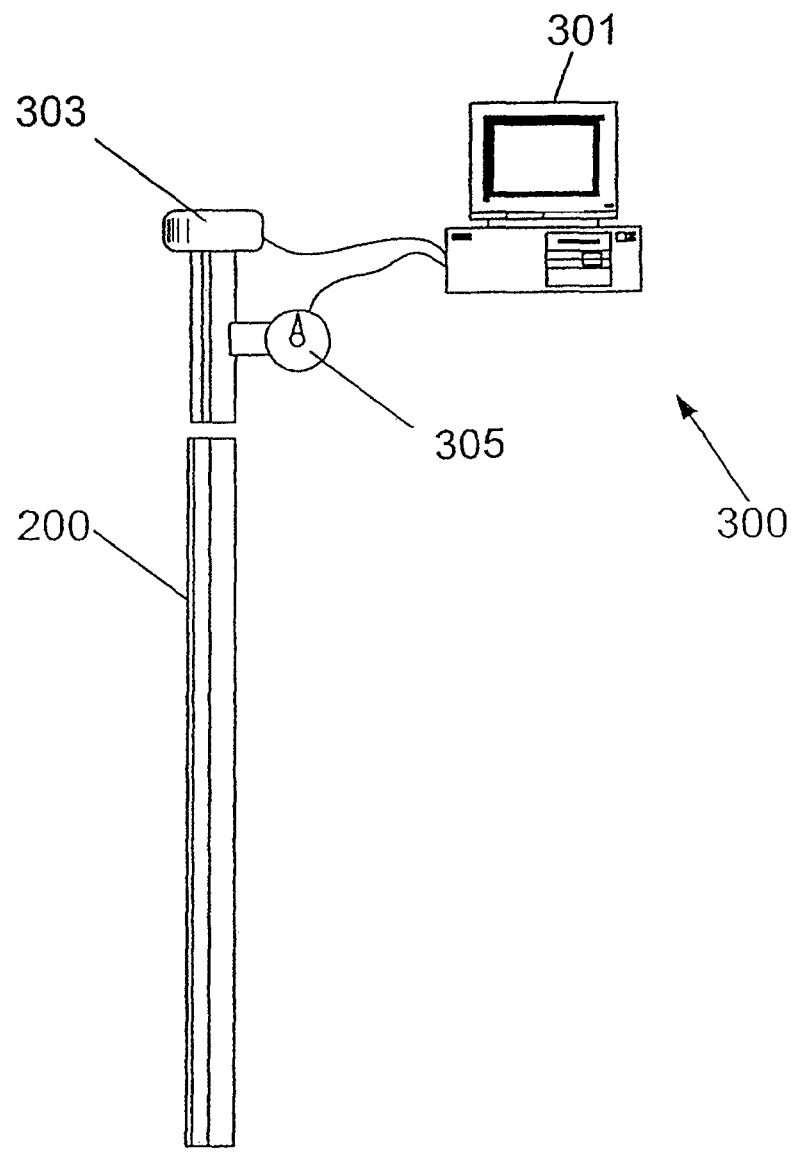
FIG. 3 is a simplified schematic view of an automated flow rate check system for checking tube flow rates according to an embodiment of the invention.

In order to ensure uniform processing, each tube 200 is checked for flow resistance after the removal of any deposits to the extent such is required. Referring now to FIG. 3, each tube 200 is connected to a flow checker system 300 to check the flow resistance. The flow checker system 300 comprises a computer 301, an airflow source 303 connected to the computer 301 so as to be computer-actuated, and a flow and/or pressure sensor 305, e.g., a manometer, connected to the computer 301 so as to be computer readable.

In operation, the airflow source 303 is mechanically connected to the tube 200 (with the deposits 203, 205 having been removed). At this point, the computer 301 executes a program, e.g., a body of computer-executable instructions stored on a computer-readable medium such as a hard drive, to verify the flow resistance of the tube 200.

Figure 4A:
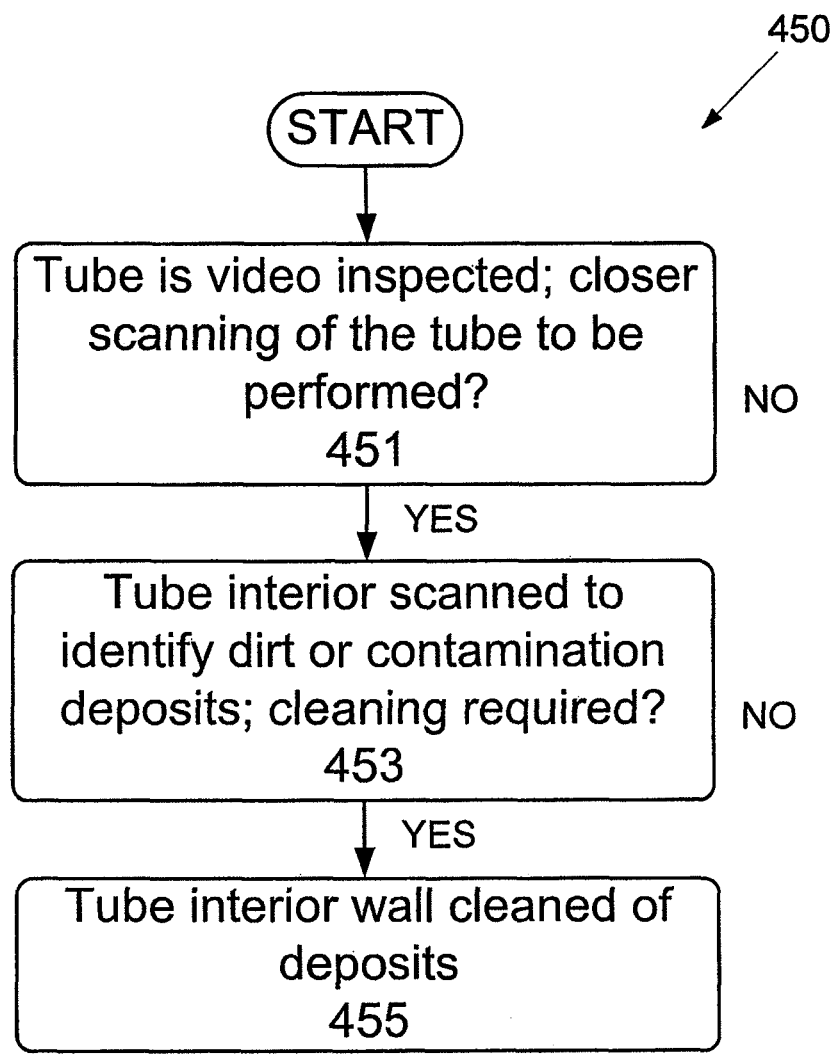
FIG. 4A is a flow chart illustrating an automated flow rate check process for execution via a computer according to an embodiment of the invention.

The flow checker process executed by the computer 301 is illustrated via process 400 in the flow chart of FIG. 4A. At stage 401 of the process 400, the computer 301 actuates the airflow source 303, e.g., via a digital relay, to force air through the tube 200. As the air passes through the tube 201, the manometer or other flow and/or pressure sensor 305 is caused to measure the flow resistance of the tube 201 at stage 403. For example, the computer 301 may read a digital or analog output of the sensor 305 at this stage. The measurement of the flow resistance will be based upon a difference in pressure or flow caused by any obstruction. For example, a tube 201 with a partially obstructed output, and hence higher flow resistance, will exhibit both decreased flow and increased pressure relative to a similar tube without any obstruction. The computer 301 optionally repeats the measurements at either the same or different input conditions at stage 405.

At stage 405, the computer 301 logs the measured values in a chart, e.g., an EXCEL chart or other chart. After a desired number of tubes have been analyzed, e.g., one hundred tubes, the computer 301 identifies in stage 407 via a chart or listing any tubes that fall outside of a predetermined range or variance relative to the other tubes analyzed. For example, the computer 301 may list as abnormal any tube that exhibits a flow resistance that is more than 5% different from the average flow resistance of the set of tubes.

Figure 4B:
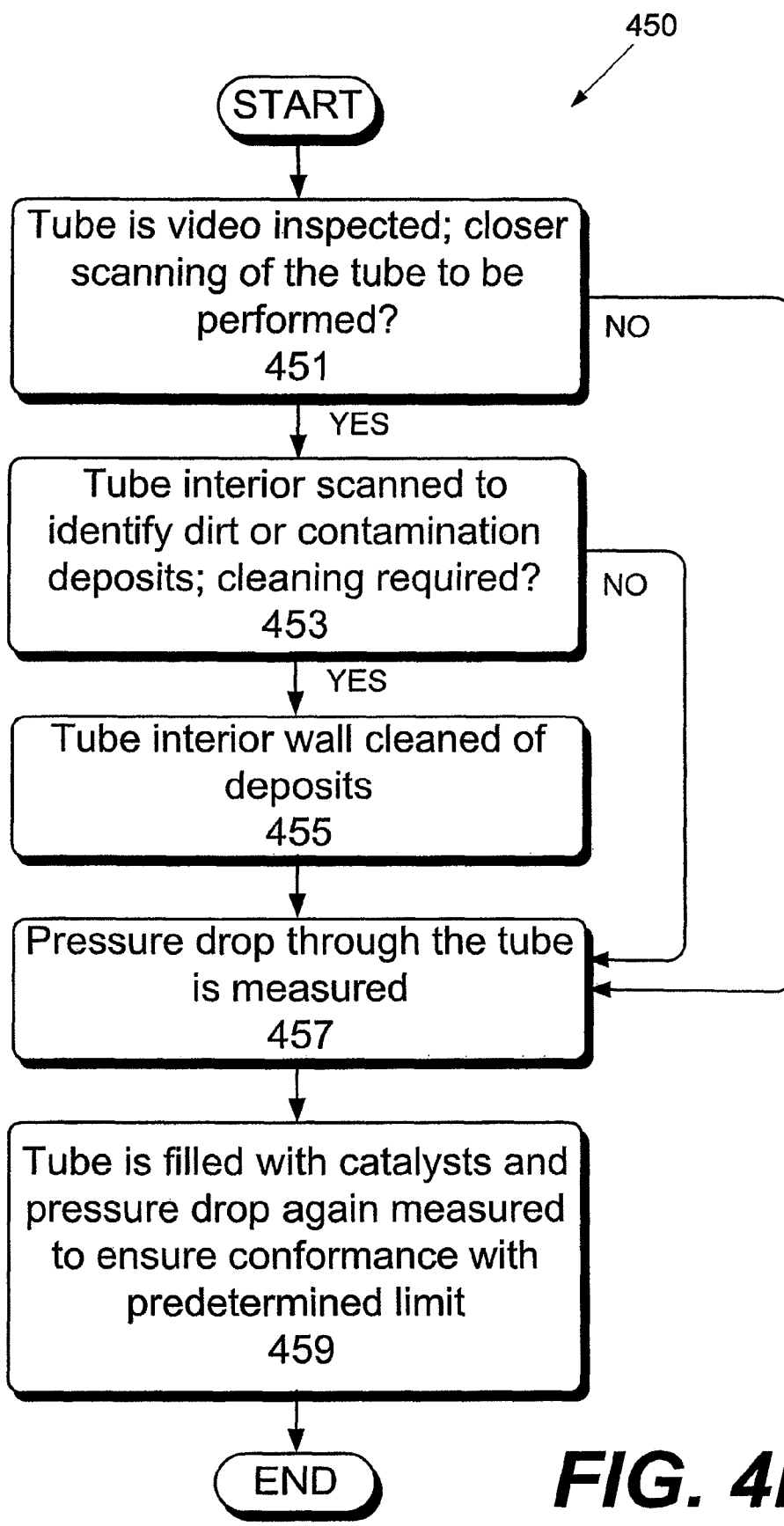
FIG. 4B is a flow chart illustrating a process for checking and filling a catalyst tube in an embodiment of the invention.

The overall process of filling, incorporating the procedure of FIG. 4A, but also incorporating additional processes, will now be discussed with reference to FIG. 4B. The illustrated combined process 450 starts at a time when the catalyst tubes are empty, either because they are new tubes or because they have been recently emptied and cleaned. At stage 451, the tube is video inspected to determine whether closer scanning of the tube is to be performed. Any manner of video inspection may be used, but in an embodiment of the invention, a video camera is lowered on an arm or wire the tube interior, and transmits video of the surface under inspection to a video display, such as a small monitor or laptop computer outside the tube.

If such inspection reveals that scanning necessary, e.g., because there are ambiguous video inspection results that may or may not indicate contamination, then the process proceeds to stage 453. At stage 453, the tube interior is closely scanned to identify dirt or contamination deposits that may need to be removed. Although any suitable scanning means may be used, in an embodiment of the invention, such scanning is executed via a rotating laser scanner lowered into the tube interior. The laser scanner measures the inside radius of the tube, to detect any deposits therein.

If the scanning of stage 453 reveals depots to be removed, the process flows stage 455. At stage 455, the tube inside wall is cleaned. Although any suitable process of cleaning may be used, in one embodiment, the cleaning is executed via a brushing device inserted into the tube, for accomplishing mechanical, e.g., abrasive, removal of any identified deposits. The cleaning may focus only on identified deposits or may be executed uniformly within the tube.

After cleaning is accomplished at stage 455, or in the event that either of stages 451 or 453 resulted in a decision that no scanning or cleaning, respectively, was needed, the process flows to stage 457. At stage 457, the pressure drop through the tube is measured. Although it will be appreciated that there are several ways to measure such a pressure drop, the pressure drop is measured in one embodiment of the invention via the apparatus described with reference to FIG. 3.

After the pressure drop is initially measured, the tube is filled with catalysts and the pressure drop again measured in stage 459. The loading of stage 459 may be executed via the loading mechanism described below or via another mechanism. Finally, at stage 461, the average pressure drop across a plurality of such filled tubes for parallel use as in FIG. 1 is calculated, and it is verified that the reading for the present tube is within a predetermined variance of that average. In an embodiment of the invention, a variance of ±2% is used to indicate a maximum acceptable deviation from the average. If the pressure reading for the tube is within the accepted level, then the process terminates, and otherwise, any necessary corrective action such as emptying, rechecking, and refilling, are executed as necessary.

Referring now more particularly to FIGS. 5-6 of the drawings, there is shown an illustrative automated catalyst loading system 500 in accordance with the invention that is adapted for automatically filling the cleaned and checked tubes, such as tube 201 in stage 459 of process 450, with particulate catalyst of uniform density and with minimum damage to catalyst particles and tube structures. The illustrated automated loading system 500 includes a fork fill tube 501 having a vertically disposed connecting tube portion 502 mounted on and communicating with an upper end of a reformer tube 201 to be filled and a fill tube portion 504 supported by and communicating at an angle with a side of the vertical connecting tube portion 502. The vertical connecting tube portion 502 and the reformer tube 201 have respective lips 505, 506 which define a coupling joint for facilitating releasable securement of the tubes 201,501 together.

Figure 7:
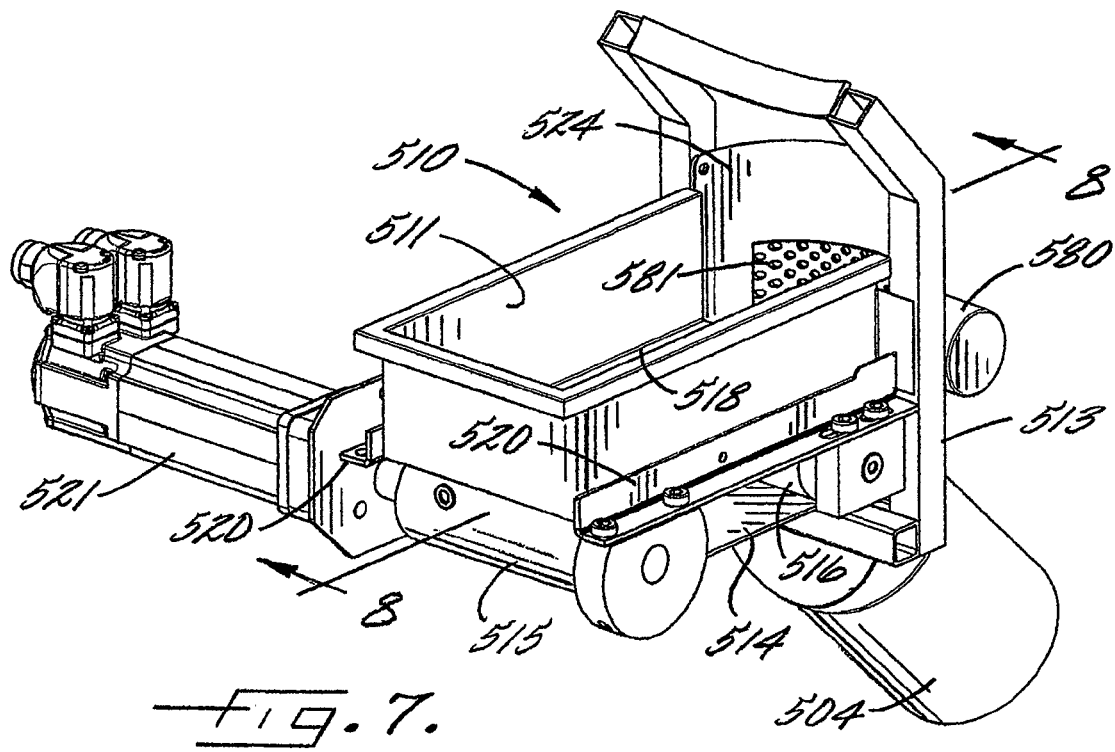
FIG. 7 is an enlarged perspective of the catalyst containing hopper and dispensing device of the illustrated loading system.
Figure 8:
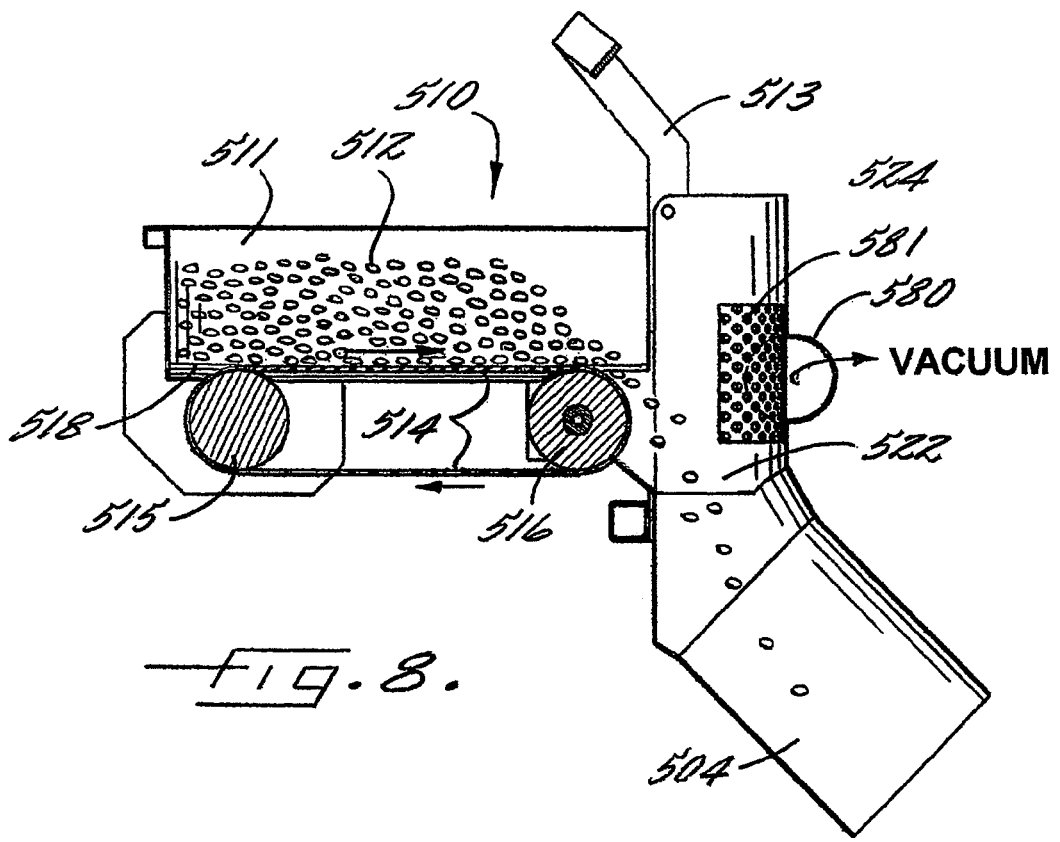
FIG. 8 is a vertical section of the catalyst hopper and dispensing device shown in FIG. 7.
Figure 11:
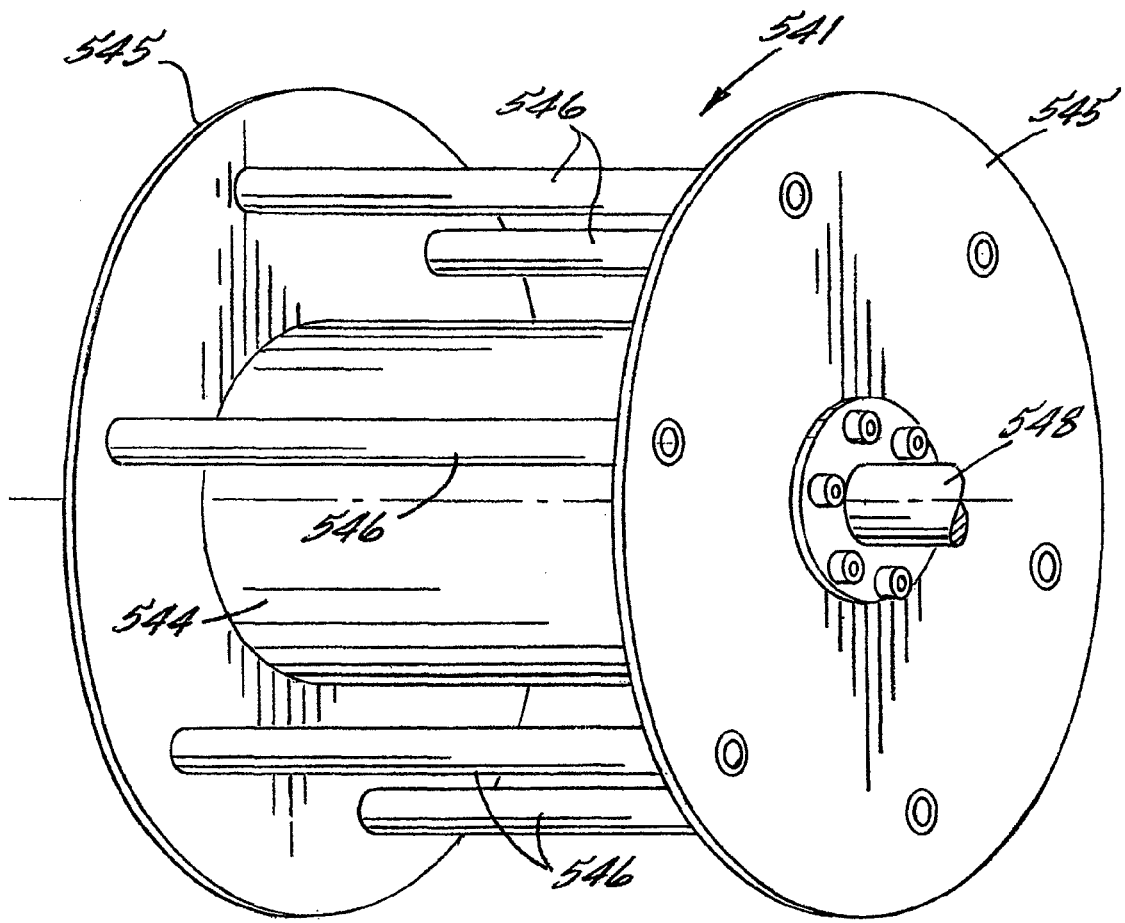
FIG. 11 is an enlarged perspective of the loading rope take up spool of the illustrated lifting device.
Figure 12:
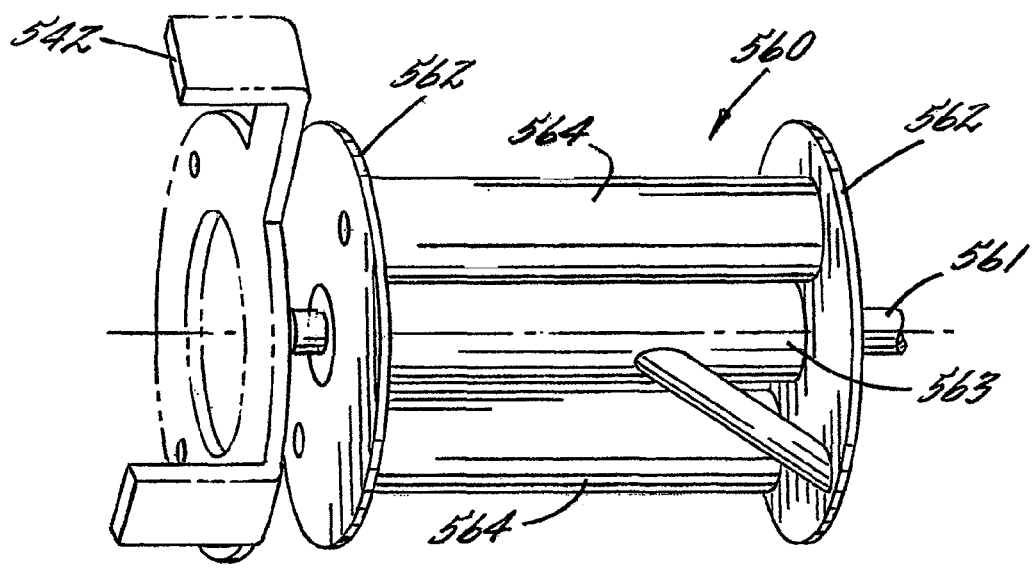
FIG. 12 is a perspective of a loading rope guide spool of the illustrated loading rope lifting device.

For directing particulate catalyst into the forked fill tube 501 and in turn into the reformer tube 200 for continuous uniform filling, a selectively operable motor driven catalyst dispenser 510 is provided. The catalyst dispenser 510 includes an open top hopper 511 for holding a supply of catalyst 512 which in this case has a support frame or structure 513 at one end to facilitate mounting of the hopper 511 in a processing facility. The bottom of the hopper 511 is defined by an endless conveyor belt 514 trained about a pair of horizontally spaced drums or pulleys 515, 516 such that an upper leg of the endless belt 514 extends along a bottom opening 518 of the hopper 511. The drums or pulleys 515,516 in this instance are rotatably supported by underlining frame members 520 of the hopper 511. For moving the conveyor belt 514 to transfer catalyst 512 from the hopper 511, a drive motor 521 is operably coupled to the pulley or drum 515. Operation of the motor 521 will thereby direct catalyst from the hopper to a downstream end of the conveyor belt 514 (i.e., the right hand end as viewed in FIGS. 7-8) for direction into a discharge shoot 522 defined by a semi-circular cover 524 mounted at one end of the hopper 511, and in turn its an upper end of the fill tube portion 504 and the reformer tube 200.

For controlling the flow of catalyst 512 introduced into the reformer tube 200, a loading rope or line 530 is suspended within the reformer tube 200 for lifting movement as the catalyst fills the tube. The loading rope 530 may be of a known type having damper members 531 in the form of a plurality of radially extending transverse bristles disposed at spaced intervals along the rope. The brush bristles of the damper members 531 preferably are flexible springs having a transverse radial dimension slightly less than the radius of the reformer tube 200 for reducing the speed of the falling catalyst particles so that breakage is avoided and the catalyst more uniformly fills the tube without undesirable voids.

In keeping with a further aspect of the loading system, for further facilitating the efficient and uniform introduction of catalyst 512 into the reformer tube 200, an automatic loading rope take-up device 540 is provided for withdrawing the loading rope 530 from the reformer tube 200 at a predetermined rate. To this end, in the illustrated embodiment, the take-up device 540 includes a motor driven take-up spool 541 to which an upper end of the loading rope 530 is secured such that upon selective rotation of the take-up spool 541, the rope 530 is wound about the take-up spool 541 as it is raised from the reformer tube 200 at a predetermined calibrated rate as determined by the rotational speed of the take-up spool 541.

The take-up spool 541 in this case is rotatably mounted in a frame 542 which can be appropriately mounted in the processing facility, such as by hanging from the ceiling by an upstanding hook 544 mounted on the upper most end of the frame 542. The illustrated take-up spool 541 comprises an inner cylindrical hub 544 to which laterally spaced circular side plates 545 are fixed, and a plurality of circumferentially spaced rods 546 are interposed between the side plates 545 in outward radial relation to the inner hub 544 which define an interrupted, non circular, winding surface of the drum.

For rotating the take-up spool 541, the central hub 544 has a drive shaft 548 which is driven by a drive motor 549 mounted on the frame 542 via a drive belt or chain 550. With an upper end of the loading rope 530 secured to the take-up spool 541, rotation of the take-up spool 541 by the drive motor 549 will cause the take-up rope to be wound upon the take-up drum and raised from the reformer tube at a predetermined rate governed by the operating speed of the motor 549. The plurality of circumferentially spaced rods 546 that define the effective non-circular winding surface of the take-up spool 541 cause the loading rope 530 to be raised with irregular movement for preventing build-up of catalyst on the damper members 531, while also facilitating positioning of the damping members 531 in flattened positions on the take-up spool 541 during such rotary take-up movement.

To further facilitate continuous loading of catalyst into the tube without undesirable build-up of catalyst on the loading rope 530, the loading rope 530 is trained about a rotatable eccentric spool 560 disposed adjacent the take-up spool 541 which is effected for successively causing the rope to swing or move up and down as it is drawn onto the take-up spool 541. The eccentric spool 560 in this case comprises a central rotatable drive shaft 561, a pair of laterally disposed circular side plates 562 mounted on the drive shaft central hub 563, and a pair of diametrically opposed rods 564 disposed between the side plates 562 outwardly of the drive hub 563. Rotation of the eccentric drive spool 560 by a drive belt or chain 566 coupled to the output shaft 551 of the drive motor 549 will cause the eccentric spool 560 to rotate simultaneously as the take-up spool 541 rotates to lift the loading rope 530 from the reformer tube 200. The diametrically opposed rods 564 of the rotating eccentric spool 560 successively engage and swing the loading rope 530 in up and down fashion to dislodge and prevent accumulation of catalyst on the damper members 531 as the rope 530 is raised from the reformer tube 200.

In accordance with a further important aspect of the catalyst loading system 500, a control is provided for controlling operation of the drive motors 521 and 549 such that loading rope 530 is raised from the reformer tube in calibrated synchronized relation to the operating speed of the feed conveyor belt 514 for ensuring continuous, uninterrupted loading of catalyst with enhanced uniformity. To this end, operation of the motors 521,549 may be driven under the control of a computer such as the computer 301, or such other computer 570 dedicated exclusively to the drive motors 521,549. Within the computer 301 and/or 570, computer-readable code stored on a computer-readable medium such as a disc or drive is read and executed by the computer processor. Such code acts to operate the drive motors 521 and 549 in a synchronized manner via suitable output drivers such as a digital to analog converter or transducer. The motor synchronization may be based either on empirical data regarding flow rates and settling and the like, or via feedback that adjusts the relative speeds of the motors based on the actual instantaneous fill level within the tube. In the latter case, detection of fill level may be via optical measurement or other suitable measurement technique.

As will be understood by a person skilled in the art, the loading rope 530 should be raised at a rate such that the lower-most damping member 531 of the loading rope 530 is raised from the reformer tube 200 at a speed such that it stays just above the level of catalyst deposit in the tube. More importantly, by means of the computer control, the rate at which the loading rope 530 is lifted from the reformer tube 200 is synchronized with the speed of the loading conveyor belt 514 for the particular loading operation. In each case, continuous loading of catalyst into the reformer tube 200 permits quicker, more uniform filling of the tubes. Indeed, the possibility of human error associated with conventional practices of filling reformer tubes is eliminated since a large number of tubes may be loaded in exactly the same manner and speed, resulting in uniformity of the filled tubes 200 and reduced pressure drop variations therein. The catalyst loading system 500 of the present invention has been found to enable up to 20% faster loading as compared to manual techniques with more uniform consistency of the catalyst loaded into the tubes.

It has been found that such improved loading efficiency and performance is enabled by virtue of the ability to automatically and continuously fill the reformer tubes 200 in a predetermined controlled manner without interruption. To facilitate such continuous automated loading of the tubes, it will be understood that the hopper 511 should be maintained at least partially filled with catalyst by personnel or by an automatic filler (not shown).

It will be further appreciated that since the continuous automated filling system 500 fills the tubes 200 with enhanced particle uniformity, there is no need to tap the tubes to prevent voids in the loaded catalyst typical of prior art procedures. As a result, the automated loading system 500 eliminates the need for vibrational elements and thus reduces the production of catalyst dust. In order to remove any small amounts of dust from the catalyst that may occur during transfer from the conveyor belt 514 into the intake duct 522, a vacuum device 580 may be mounted in communication with a vacuum outlet 581 formed by a screened wall in the discharge shoot cover duct 524.

It will be appreciated that a new and useful system for reformer tube filling and processing has been described herein by way of example. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. A system for loading particles of particulate material into a tube comprising:
   a hopper for containing a supply of said particulate material for introduction into the tube,
   a dispenser driven by a motor for directing particles of particulate material from said hopper into said tube, said dispenser including a conveyor for receiving particulate material from said hopper and discharging said particulate material in a controlled fashion into said tube,
   a loading rope disposed within said tube for controlling the flow and said particulate material introduced into said tube,
   a rope lifting device for raising said loading rope from said tube as said particulate material is introduced therein by said motor driven dispenser, said loading rope lifting device including a take-up spool about which said rope is wound in response to rotary movement of the spool, a drive motor for the rope lifting device for rotating the take-up spool at a predetermined speed, and
   a control for automatically controlling the operating speed of said rope lifting device drive motor in relation to the operating speed of said conveyor dispenser drive motor, said controller being operable to coordinate that the operating speed of the rope lifting device drive motor with the operating speed of the conveyor dispenser motor in order to automatically synchronize the raising of the loading rope in relation to the rate particulate material is deposited in said tube so that the particulate matter is loaded into the tube with uniform density.

2. The particulate material loading system of claim 1 in which said control operates the motor of said driven dispenser and the motor of the rope lifting device such that said particulate material continuously introduced into said tube until filling is complete.

3. The particulate material loading system of claim 1 in which said take-up spool defines a non-circular take-up surface about which said loading rope is wound, a rotatable guide spool having a non-circular outer surface about which said loading rope passes as it is being wound onto said take-up spool, and a drive motor for rotatably driving said guide spool.

4. The particulate material loading system of claim 1 in which said dispenser includes a discharge chute communicating with said tube into which particulate material is directed from said conveyor.

5. The particulate material loading system of claim 4 including a power operated vacuum device communicating with said discharge chute for evacuating any dust from the particulate material generated upon direction of said particulate material from said conveyor into said discharge chute.

6. A system for loading particles of particulate material into a tube comprising:
   a hopper for containing a supply of said particulate material for introduction into the tube,
   a motor driven dispenser for directing particles of particulate material from said hopper into said tube,
   a loading rope disposed within said tube for controlling the flow and said particulate material introduced into said tube,
   a rope lifting device for automatically raising said loading rope from said tube as said particulate material is introduced therein by said motor driven dispenser, said loading rope lifting device including a take-up spool having a non-circular take-up surface about which said rope is wound in response to rotary movement of the spool and a drive motor for rotating the take-up spool at a predetermined speed, and
   a control for automatically controlling the operating speed of said motor of the rope lifting device and the operating speed of said motor driven dispenser, the controller being adapted to coordinate that the operating speed of the motor of the rope lifting device with the operating speed of the motor driven dispenser in order to synchronize the raising of the loading rope with the depositing of particulate material in said tube.

7. The particulate material loading system of claim 6 including a rotatable guide spool having a non-circular outer surface about which said loading rope passes as it is being wound onto said take-up spool, and a drive motor for rotatably driving said guide spool.

8. A system for loading particles of particulate material into a tube comprising:
   a hopper for containing a supply of said particulate material for introduction into the tube,
   a motor driven dispenser for directing particles of particulate material from said hopper into said tube,
   a loading rope disposed within said tube for controlling the flow and said particulate material introduced into said tube,
   a rope lifting device for automatically raising said loading rope from said tube as said particulate material is introduced therein by said motor driven dispenser, said loading rope lifting device including a take-up spool about which said rope, is wound in response to rotary movement of the spool and a drive motor for rotating the take-up spool at a predetermined speed, a rotatable guide spool having a non-circular outer surface about which said loading rope passes as it is being wound onto said take-up spool, and a drive motor for rotatably driving said guide spool, and
   a control for automatically controlling the operating speed of said motor of the rope lifting device and the operating speed of said motor driven dispenser, the controller being adapted to coordinate that the operating speed of the motor of the rope lifting device with the operating speed of the motor driven dispenser in order to synchronize the raising of the loading rope with the depositing of particulate material in said tube.

\* \* \* \* \*